No. 894,435. PATENTED JULY 28, 1908.
J. T. HARRIS.
ELECTROLYTIC APPARATUS FOR PURIFYING LIQUIDS.
APPLICATION FILED JULY 9, 1906.
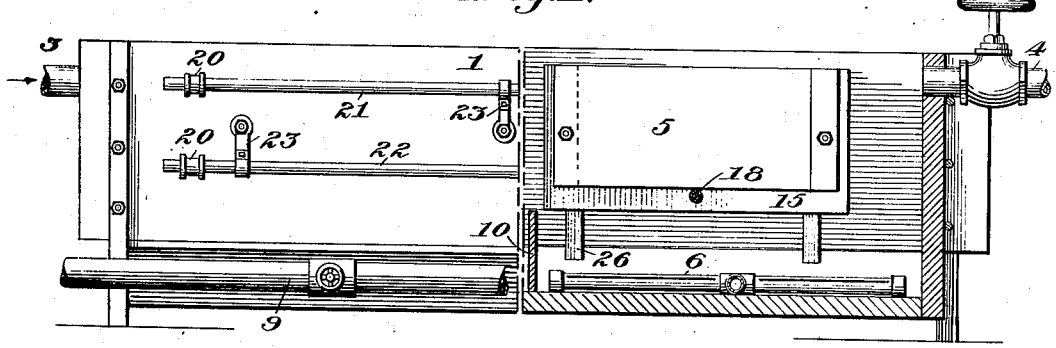
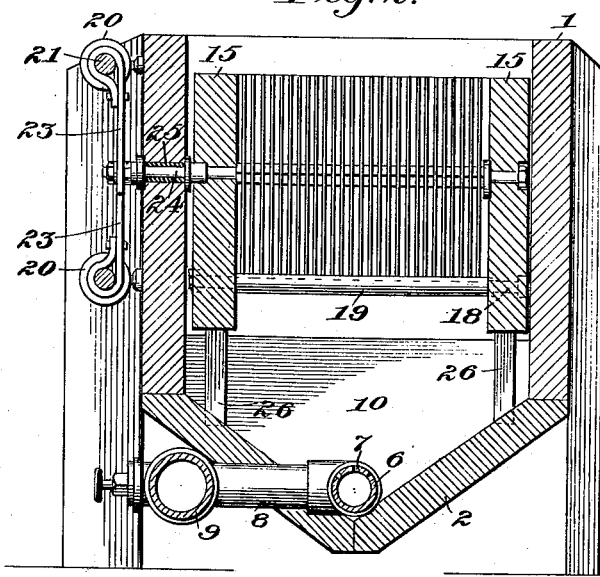
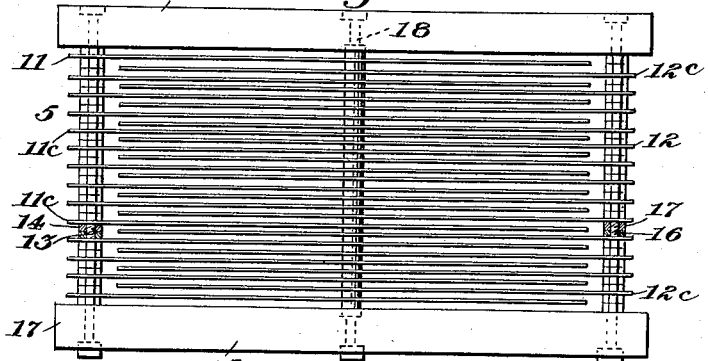

UNITED STATES PATENT OFFICE.

JOHN T. HARRIS, OF NEW YORK, N. Y.

ELECTROLYTIC APPARATUS FOR PURIFYING LIQUIDS.

No. 894,435.  Specification of Letters Patent.  Patented July 28, 1908.

Application filed July 9, 1906. Serial No. 325,375.

*To all whom it may concern:*

Be it known that I, JOHN T. HARRIS, a citizen of the United States, residing at New York city, in the county of New York and State of New York, having invented certain new and useful Improvements in Electrolytic Apparatus for Purifying Liquids, of which the following is a specification.

This apparatus is especially intended for the treatment of water, to remove impurities such as organic matter and mineral salts and to produce a perfectly clear, bright and palatable water, sterilized and free from color and odor.

The apparatus comprises a vessel or conduit and electrodes therein, preferably comprising dissimilar trivalent metals capable of yielding a coagulant, specifically a colloidal hydroxid, for removing the impurities in the water.

In the preferred construction, the apparatus is a trough containing a series of groups of electrodes, each group consisting of parallel plates, alternately of opposite polarity and consisting, respectively, of iron and aluminum; a certain number of the plates in either or both groups are preferably replaced by a plate or plates of copper. The trough is preferably V-shaped at the bottom and means are provided for periodically removing any sediment collecting therein.

One form of apparatus which has been found efficient is shown in the accompanying drawings, in which:

Figure 1 is a side elevation of the electrolytic tank, the middle portion being broken out and one end being shown in vertical longitudinal section, with a group of electrodes in elevation; Fig. 2 is a transverse vertical section through the tank and a group of electrodes therein; and Fig. 3 is a plan view of one group of electrodes.

The apparatus shown comprises an electrolytic tank 1, which may be of wood, having a V-shaped bottom 2. Water may be introduced into one end of the tank through pipe 3, and continuously or intermittently removed from the other through the valved outlet pipe 4. Several groups 5 of electrodes are arranged within the tank, in longitudinal series, the electrodes being parallel with the sides of the tank so that water introduced at one end may flow without obstruction between the electrodes of each group. Beneath each set of electrodes is a longitudinally-disposed pipe 6, perforated or slotted in its upper side as shown at 7, said pipe being preferably in sections extending under one or more groups of electrodes, each section connected by a transverse valved pipe 8 with a supply pipe 9.

10 represents a baffle or partition, located in the lower portion of the tank between the several pipe sections 6, and preferably adjustable in the tank. This baffle serves the double purpose of deflecting the liquid to be purified upwardly into contact with the electrodes, and providing a plurality of compartments from which the sediment may be readily removed by water admitted under suitable pressure through the valved pipes 8.

The electrodes may consist of thin rectangular plates, alternately of dissimilar trivalent metals capable of yielding a coagulent, substantially as described in my pending application Serial No. 253,157, filed March 31, 1905. They preferably consist of iron and aluminum, which under the action of the electric current yield a voluminous, colloidal hydroxid, which combines with every particle of organic matter in the water, producing a coagulant which can be easily settled out or removed by filtration. Each group of electrodes shown comprises fourteen anodes 11 and thirteen intermediate cathodes 12, the anodes consisting, except as hereinafter described, of iron and the cathodes of aluminum. The end of each anode is perforated and projects beyond the end of the group of electrodes. A threaded iron rod 13 passes through the apertured end of each anode and is clamped in longitudinal contact with the anodes by iron nuts 14, two of these nuts lying between and serving to space adjacent anodes. The ends of the rod 13 pass through openings in vertical wooden plates 15 arranged at each side of the group of electrodes. The rod 13 thus serves both as an electrical connector and a support for one end of the anodes. The ends of the cathodes 12 are also perforated and extend beyond the end of the group of electrodes. A threaded iron rod 16 extends through and is clamped to the ends of the cathodes by iron nuts 17. The rod 16 passes through the wooden plates 15 and serves as a negative connector for the cathodes. Beneath the middle portion of each group of electrodes is a transverse iron rod 18 which extends through and is clamped to the wooden plates. Upon this rod is an insulating sleeve 19, preferably of hard rubber, which serves as a support for both anodes and cathodes. Upon one side of the tank are secured insulators 20 which support superposed copper rods 21, 22, the upper rod being coupled to the negative terminal of the source of electric current and the lower rod to its positive terminal. To each rod are secured copper straps 23 the free ends of which are bolted to copper pins 24 which pass through insulating bushings 25 in the side of the tank and are coupled, respectively, to the iron rods 13, 16. The wooden side plates 15 of each group of electrodes rest upon wooden blocks 26 which are supported on the bottom of the tank. It will be seen that each group of electrodes, with its side plates, is a compact unit which can be removed from the tank when the pins 24 are uncoupled.

It has been found by experiment that the use of electrodes of dissimilar trivalent metals, such as iron and aluminum, results in the production of the desired coagulant in a much shorter time than when both electrodes are of iron or aluminum. It has also been found that the use of an iron rod and nuts to couple the iron electrodes and of an iron rod and nuts to couple the aluminum electrodes increases the rate of production and amount of coagulent, this presumably being due to local electrolytic action between the dissimilar metals in contact. By employing a tank of sufficient length and several groups of electrodes therein, the water can be continuously delivered to and passed through and from the tank, carrying with it the coagulated impurities which may then be easily removed by a filter. While the electrodes of iron and aluminum or other dissimilar trivalent metals are preferably arranged in alternation as shown, the aluminum electrodes may be otherwise distributed but it is essential that each alternate electrode should consist of aluminum. In some cases an alternating current may be employed instead of a direct one, each electrode then serving alternately as anode and cathode.

From time to time, and as sediment collects in the lower portion of the tank, sufficient water may be admitted through one or more of the sectional pipes 6 to remove the sediment, and to cause it to pass in suspension through the outlet pipe 4. This may be done automatically at fixed intervals.

I have found that liquids are more effectively sterilized when one or more copper plates are employed; and that such copper plates are effective whether connected to the positive or negative terminal. In the drawing I have indicated the two exterior cathode plates 12ᶜ as of copper, and two intermediate anode plates 11ᶜ as also of copper, but it will be understood that the number of such plates employed in either or both groups of electrodes will depend upon the volume and character of the liquid under treatment and the character of the current.

I claim:—

1. Apparatus for purifying water comprising a water-main, a vessel, electrodes longitudinally disposed in said vessel and alternately of opposite polarity, said electrodes consisting of a metal or metals capable of yielding a colloidal hydroxid, and an inlet pipe connected with said water-main and extending beneath said electrodes and substantially parallel thereto.

2. Apparatus for purifying water comprising a water-main, a vessel, a plurality of groups of electrodes longitudinally disposed in said vessel, and an inlet pipe disposed beneath and parallel to each of said groups of electrodes and connected with said water-main.

3. An electrolytic apparatus for purifying liquids comprising a vessel, a plurality of groups of electrodes longitudinally disposed therein, and baffles arranged in the lower portion of the vessel between said groups of electrodes, substantially as described.

4. An electrolytic apparatus for purifying liquids comprising a vessel, a plurality of groups of electrodes longitudinally disposed therein, an inlet pipe arranged beneath each of said groups of electrodes, and baffles in the lower portion of the vessel between said groups, substantially as described.

5. An electrolytic apparatus for purifying liquids comprising electrodes of opposite polarity and consisting of a metal or metals capable of yielding a colloidal hydroxid, and auxiliary electrodes of copper, substantially as described.

6. An electrolytic apparatus for purifying liquids comprising electrodes of opposite polarity and consisting of dissimilar trivalent metals capable of yielding a colloidal hydroxid, and auxiliary electrodes of copper, substantially as described.

7. An electrolytic apparatus for purifying liquids comprising electrodes of opposite polarity and consisting of iron and aluminum, and auxiliary electrodes of copper, substantially as described.

In testimony whereof, I affix my signature in presence of two witnesses.

JOHN T. HARRIS.

Witnesses:
S. V. NOBLE,
SAMUEL OSBORN.